Figure 1:
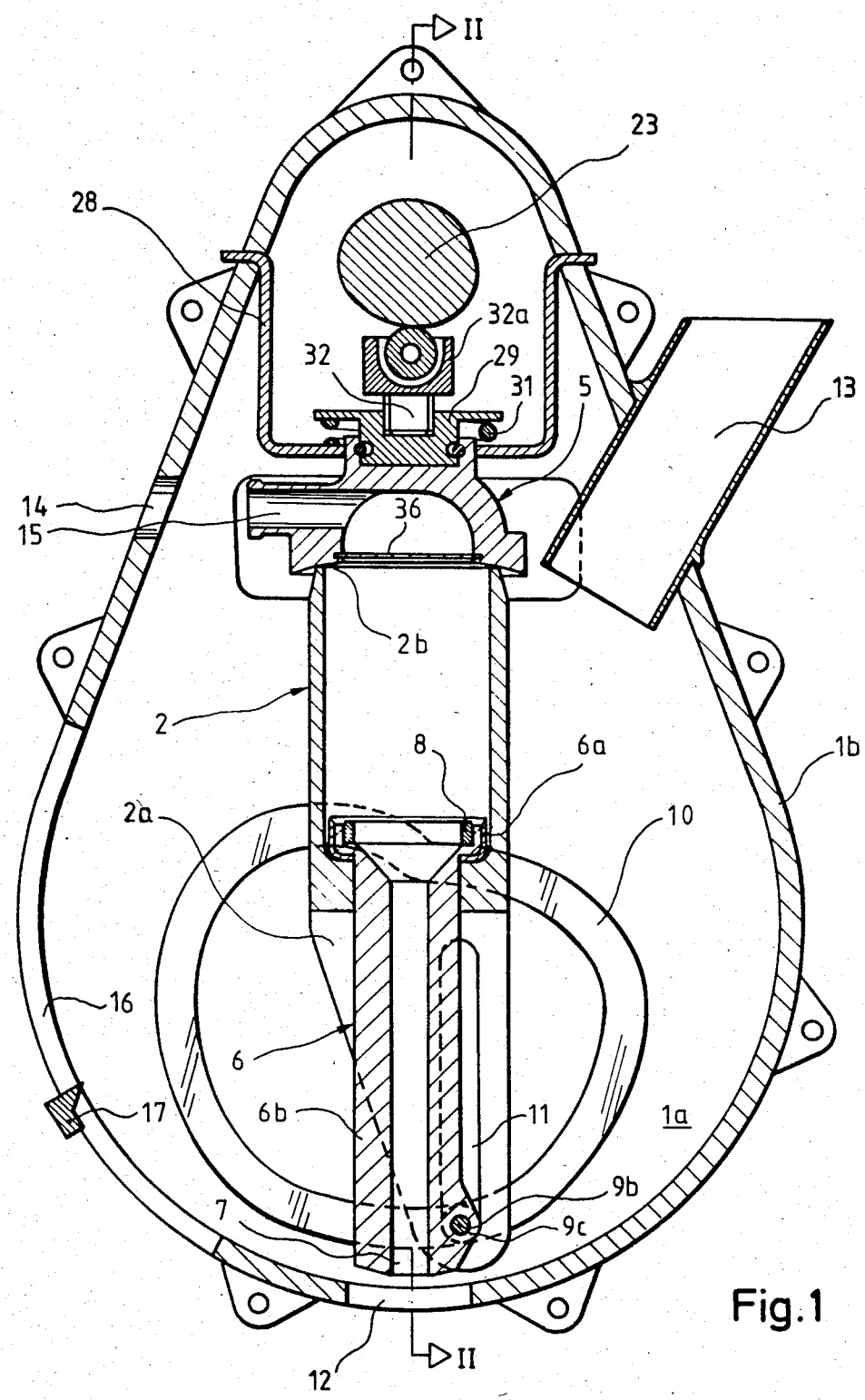

United States Patent [19]

Rodrigues

[11] Patent Number: 4,579,049

[45] Date of Patent: Apr. 1, 1986

[54] COFFEE PERCOLATOR

[75] Inventor: Patrick Rodrigues, Heidenheim, Fed. Rep. of Germany

[73] Assignee: Wurttenbergische Metallwarenfabrik AG, Fed. Rep. of Germany

[21] Appl. No.: 605,187

[22] Filed: Apr. 30, 1984

[30] Foreign Application Priority Data

May 3, 1983 [DE] Fed. Rep. of Germany ....... 3316159

[51] Int. Cl.$^4$ ............................................. A47J 31/00
[52] U.S. Cl. ................................. 99/289 R; 99/302 P
[58] Field of Search ................. 99/279, 289 R, 289 D, 99/297, 302 P, 302 R, 307; 426/433

[56] References Cited

U.S. PATENT DOCUMENTS

| 3,266,410 | 8/1966 | Novi | 99/289 R |
| 3,754,462 | 8/1973 | Brill | 99/289 R |
| 3,760,712 | 9/1973 | Rossi | 99/289 R |
| 4,034,660 | 7/1977 | Egi | 99/289 R |

FOREIGN PATENT DOCUMENTS 1248883  3/1968  Fed. Rep. of Germany .
1404818  2/1972  Fed. Rep. of Germany .

Primary Examiner—Robert W. Jenkins
Attorney, Agent, or Firm—Arnold, White & Durkee

[57] ABSTRACT

The invention relates to a coffee percolating machine comprising a housing including coffee meal and hot water supply means, an outlet opening for the coffee brew, and a discharge opening for the exhausted coffee meal, at least one brewing cylinder having an open inlet end and mounted in the housing for rotation about an axis perpendicular to its longitudinal axis from a coffee meal charging position to a brewing position and on to a discharge position for discharging the exhausted coffee meal, and a piston disposed in the brewing cylinder for axial displacement therein in response to the position assumed thereby. In order to avoid the otherwise necessary frequent cleaning of the machine by an operator, and the malfunctions caused by contamination as a result of such frequent cleaning not having been carried out in the case of a coffee percolating machine with an automatically proceeding brewing cycle, the invention provides a positive position control for the piston derived from the rotation of the brewing cylinder. This positive position control eliminates the need of continual supervision and permits the exhausted coffee meal to be expelled completely without additional cleaning with water. In a particularly simple embodiment, the positive position control means consists of a guide path within the housing an a follower member on the piston.

18 Claims, 9 Drawing Figures

COFFEE PERCOLATOR

DESCRIPTION

The present invention relates to a coffee percolating machine of the type defined in the generic clause of claim 1.

A coffee percolating machine of this type is known from DE-PS 1,248,883. The housing of this machine is formed with a cylindrical cavity containing a rotary valve member mounted therein for rotation through manual operation of a central shaft. The rotary valve member includes three chambers serving as brewing cylinders the imaginary longitudinal axes of which are radially directed towards the center of the valve member at equal angular spacings. Each brewing cylinder opens outwards towards the periphery of the rotary valve member. The housing is formed with three openings directed towards the rotary valve member at equal angular spacings. One of these openings is connected to a coffee meal charging hopper, while another one serves as an outflow opening for discharging the brewed coffee towards an outlet duct. The size of these two openings substantially corresponds to that of the open ends of the brewing cylinders. The third opening of the housing, provided therein for discharging the exhausted coffee meal, extends over a greater peripheral sector of the cylindrical housing cavity. Each brewing cylinder contains an axially slidable piston provided with a sieve at its end facing the open end of the respective cylinder and formed with openings for the passage of water therethrough. Channels formed in the rotary valve member for the supply of water open into the respective cylinders rearwards of the respective pistons, i.e. at a location remote from the open end of the cylinder.

The known coffee percolating machine is operated by manually rotating the rotary valve member for a full revolution for each brewing cycle, so that each brewing cylinder successively assumes three operating positions. The movement of the pistons within the cylinders takes place in an uncontrolled fashion under the influence of gravity, depending upon the position of the respective brewing cylinder, i.e. upon the orientation of the rotary valve member. In the brewing position, an additional force is exerted on the cylinder bottom surface by the water supplied to the cylinder before passing through the piston openings. This results in the piston together with the coffee meal deposited thereon being forced into engagement with a second sieve fixedly mounted in the housing. In the discharge and cleaning position, assumed by one of the brewing cylinders while the two others assume the charging and brewing positions, respectively, cleaning water is supplied to the lower cylinder portion to flow through the piston openings in the same manner as the water supplied for coffee making, so as to rinse the piston sieve and to propel the piston outwards, whereby the remaining coffee meal is discharged through the housing opening together with the cleaning water.

This known machine is not designed for carrying out an automatic coffee making process, in which the brewing cycle proceeds in a fully automatized manner. Any contaminations or obstructions which might otherwise impair the quality of the coffee or might even stop the operation of the machine are detected and may be corrected by the operator. A particular problem is presented by the manner in which the pistons are displaced. The uncontrolled piston displacement under the influence of gravity does not ensure that the piston advances completely up to the end of the cylinder and that it subsequently moves back to the cylinder bottom in the charging position, so as to provide a sufficient volume for the introduction of coffee meal. The problem of the piston movement being obstructed presents itself particularly after the machine has not been used for making coffee over an extended period. In this case, the piston may be adhesively retained in the position by dried residues between it and the cylinder wall. The effect of the water supply is not either able to ensure proper piston displacement unless the water passage openings in the piston are made very small, so that the pressure exerted by the water on the piston bottom prevails. In this case it is to be feared, however, that neither the brewing of the coffee nor the subsequent cleaning is carried out at a sufficient pressure for attaining the desired results. An additional disadvantage of the uncontrolled displacement of the pistons within the cylinders is to be seen in the fact that the discharge opening of the housing has to be provided with suitable means for preventing the pistons from dropping out of their respective cylinders. A rib or the like provided to this effect is disposed in the path taken by the exhausted coffee meal and the cleaning water on discharge thereof, requiring frequent cleaning of the respective region. Such frequent cleaning is possible, although at some expense, in the case of a manually operated machine, but not in the case of an automatized coffee making process.

It is thus an object of the present invention to provide a coffee percolating machine of the type defined in the introduction, which is capable of carrying out a fully automatized coffee brewing process with the aid of simple means, and wherein the optimum piston position is ensured during each phase, while permitting the coffee meal residue to be reliably discharged in a simple manner.

This object is attained according to the invention by the characteristics disclosed in claim 1.

The claimed provisions ensure the proper positioning of the piston within the cylinder during each phase of the brewing cycle, irrespective of the piston weight, the presence of residues in the cylinder or other causes. The piston is positively moved as long as the cylinder is rotated. It is only due to this arrangement that the automatic operation of the coffee percolating machine is made possible. Since the piston cannot drop out of the cylinder at any position thereof, it may be advanced during the discharge phase to a position closely adjacent the open cylinder end or even projecting therebeyond, so that the exhausted coffee meal is in practice completely discharged without requiring an additional wet cleaning step.

This results in a considerably simplified construction and reduced operating costs. Also eliminated is the need for a structural element in the path of the discharged coffee meal for retaining the piston. In the charging position of the cylinder/piston arrangement there is always provided a sufficient volume for receiving the coffee meal.

A coffee percolating machine of particularly simple construction is provided by the characteristics of claim 2. The positive position control means formed in this manner offers the additional advantage of being substantially failure-proof and not requiring frequent maintenance.

These aspects are further improved by the characteristics disclosed in claims 3 to 6.

A still further improved embodiment of the coffee percolating machine according to the invention results from the characteristics of claim 7. The employ of the gear segment results in an accurately controlled cylinder movement being achieved in combination with a similarly uniform piston movement. It is in fact already known (DE-PS 1,404,818) to employ a gear segment in the drive mechanism of a coffee percolating machine having a rotatable brewing chamber. In this known embodiment, however, the gear segment is of one-piece construction with a pinion having teeth about its entire periphery for continuously rotating a cam. The gear segment itself cooperates with a maltese cross transmission for intermittently rotating a drum containing the brewing chamber. Although the brewing chamber contains a longitudinally displaceable insert, the latter cannot be considered a piston in the sense of the above discussion, as it has only to be adjusted in the longitudinal direction, and that only prior to beginning a brewing cycle, for varying the amount of coffee to be made in a single brewing cycle. The insert thus merely serves to vary the volume of the cavity to be filled with the coffee meal.

In the case of a coffee percolating machine having a lid adapted to be forced into engagement with the open end of the brewing cylinder by means of a driven cam member, as in the case of the above discussed construction known from DE-PS 1,404,818, the characteristic of claim 8 results in an advantageous utilization of the rotary drive means. During the brewing process proper, during which the brewing cylinder is not rotated, the cam is driven by the gear segment to force the lid into engagement with the open end of the brewing cylinder. On the other hand, the lid cannot assume its closed position during further rotating movement of the brewing cylinder. This results in the advantage that a single driven transmission member alternately performs two different driving functions. This again results in the further advantage that the torque to be developed is distributed substantially uniformly over the brewing cycle, so that a relatively simple and small drive motor of the size for instance of a windshield wiper motor may be employed. Independent protection is therefore claimed for this gear segment drive transmission which may also be employed independently of the positive position control arrangement.

The cylinder may be arrested at the brewing position in a simple and effective manner, and released from the arrested position on resumption of the driving power transmission by the employ of the characteristics of claims 10 and 11.

Figure 2:
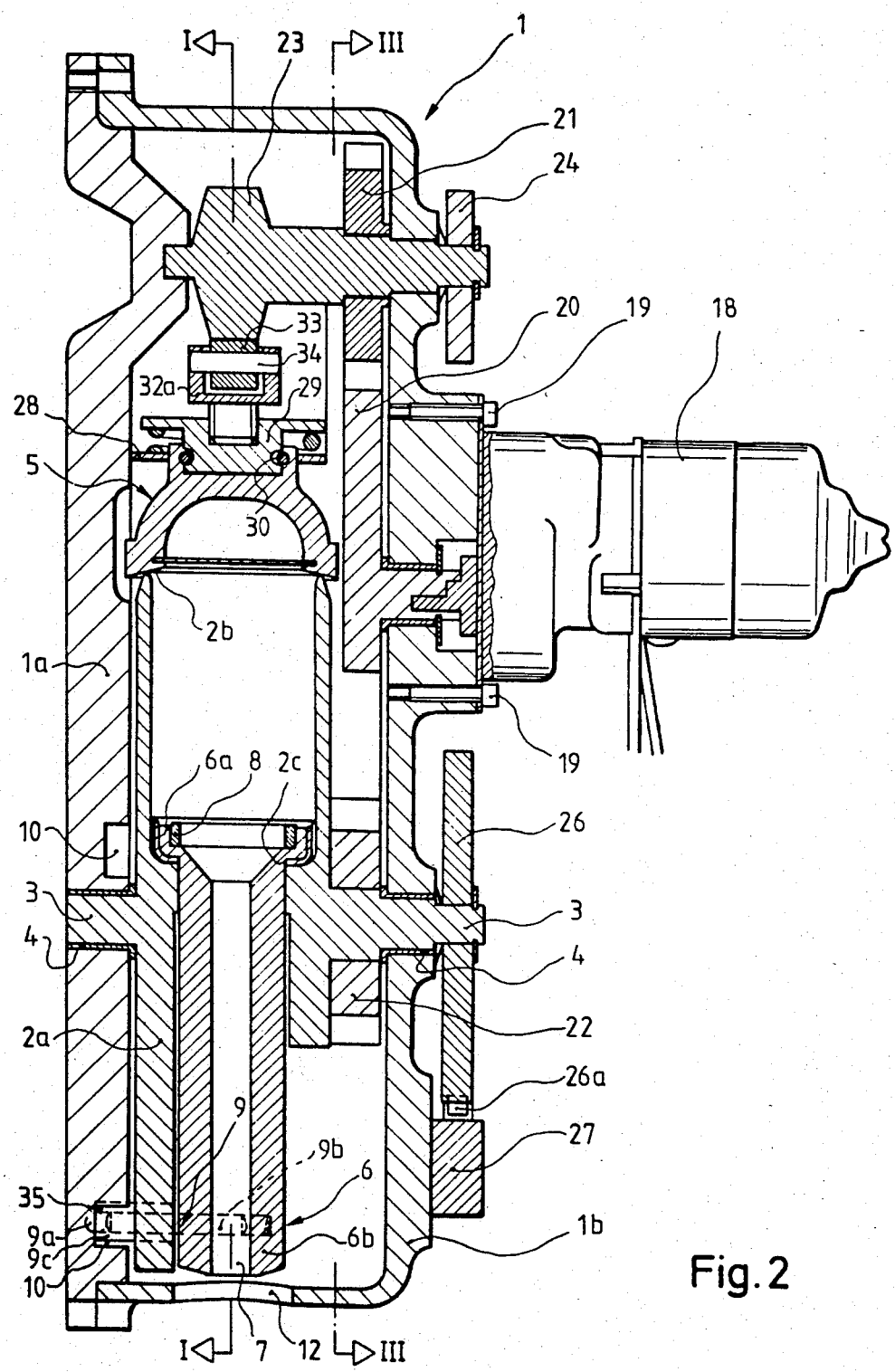
Figure 3:
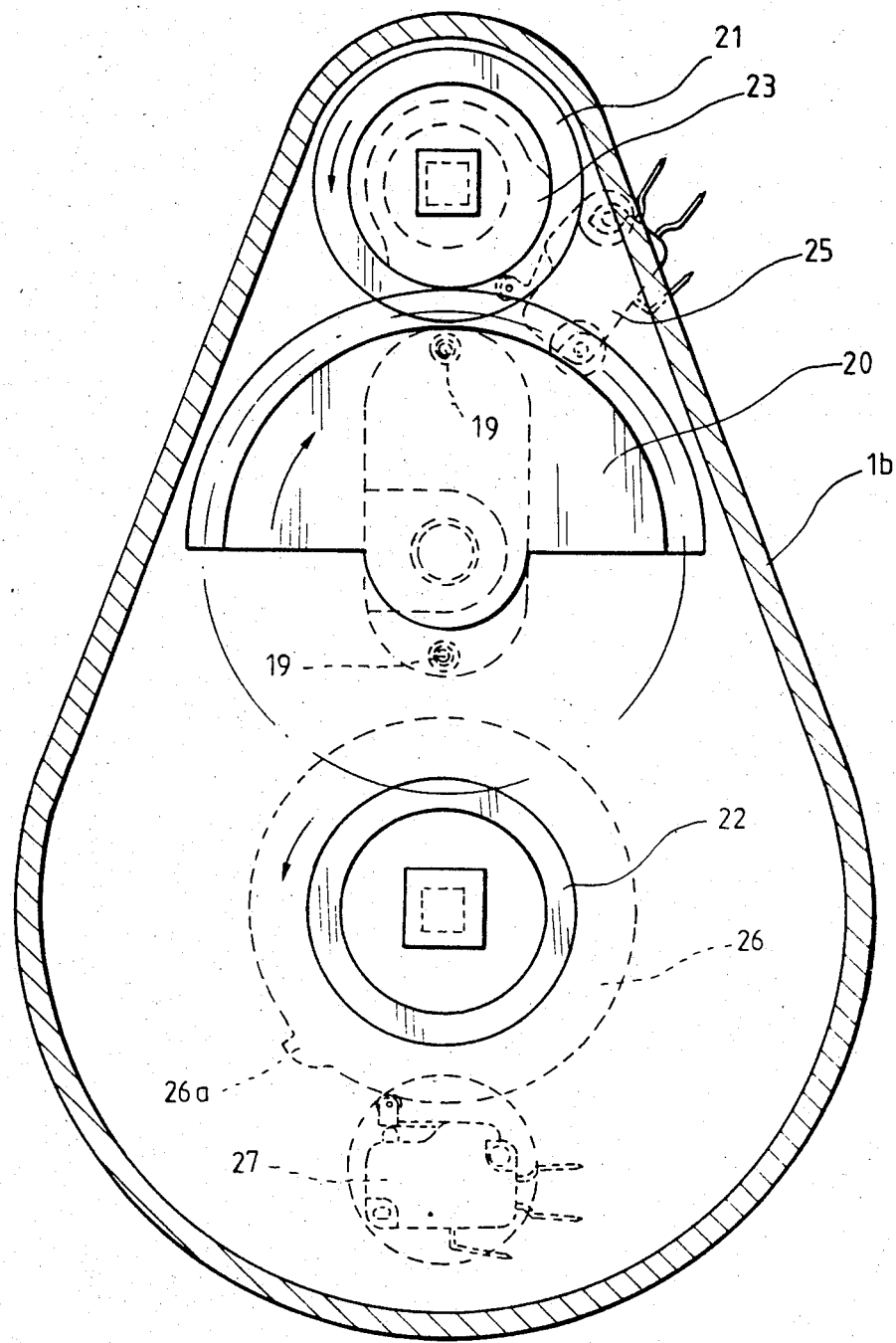

An exemplary embodiment of a coffee percolating machine according to the invention shall now be described with reference to the accompanying drawings, wherein:

FIG. 1 shows a partially diagrammatical cross-sectional view of a coffee percolating machine taken along the line I—I in FIG. 2, FIG. 2 shows a cross-sectional view of the coffee percolating machine taken along the line II—II in FIG. 1, FIG. 3 shows a detail of the coffee percolating machine substantially as indicated at III—III in FIG. 2, FIGS. 4 to 6 show diagrammatic views of the coffee percolating machine in different operating positions, namely:

FIG. 4a is a diagrammatic, sectional view, similar to FIG. 1, of the machine in the rest position, FIG. 4b is a diagrammatic, sectional view, similar to FIG. 3, of the machine in the rest position, FIG. 5a is a diagrammatic, sectional view, similar to FIG. 1, of the machine in the arrested position, FIG. 5b is a diagrammatic, sectional view, similar to FIG. 3, of the machine in the arrested position, FIG. 6a is a diagrammatic, sectional view, similar to FIG. 1, of the machine in the meal expelling position, and FIG. 6b is a diagrammatic, sectional view, similar to FIG. 3, of the machine in the meal expelling position.

Rotatably mounted in a housing 1 substantially consisting of a rear wall 1a and a hood-like cover 1b is a brewing cylinder generally indicated at 2. Cylinder 2 is provided with mounting pins 3 formed integrally with an extension 2a of the cylinder wall. Bearings 4 for receiving mounting pins 3 therein are located in housing rear wall 1a and housing cover 1b as indicated in FIG. 2. Pins 3 define an axis of rotation of cylinder 2 extending perpendicular to the imaginary longitudinal axis thereof. In FIGS. 1 to 3 the brewing cylinder and associated parts are shown in the brewing position, as will be explained in detail hereinafter.

Brewing cylinder 2 is formed with an open end 2b closed during the brewing process proper by means of a lid 5 generally indicated at 5. The opposite end of cylinder 2 is formed with an opening 2c for a piston 6 consisting of a piston head 6a slidably guided within cylinder 2, and a piston rod 60 extending therefrom and having a reduced diameter corresponding to that of opening 2c. The piston head and rod are formed with a coffee outlet passage extending therethrough over their full length. Disposed on the end surface of piston head 6a facing towards open end 2b of cylinder 2 is a percolating sieve 8. Piston rod 6b is provided with a follower member 9 adjacent its free end. Follower member 9 comprises a roller 9c engaged with a guide path 10. Mounted within roller 9c is a spring-biased pin 9b forcing roller body 9a into engagement with the bottom surface of guide path 10. Guide path 10 is formed in housing rear wall 1a in the form of a groove defining a closed loop. Guide path 10 is formed with a dwell detent 35 to be engaged by roller body 9a in the brewing position of cylinder 2. The extended wall portion 2a of cylinder 2 extends to a point closely adjacent the free end of piston rod 6b in its fully extended position, and is formed with an elongate through-opening extending parallel to piston rod 6b for follower member 9 to project therethrough.

The lower portion of housing cover 1b is formed with a coffee outlet opening 12 in alignment with coffee outlet passage 7 in the brewing position of cylinder 2. The upper portion of housing cover 1b is formed with coffee meal charging means in the form of a tube 13, and substantially opposite thereto with a hot water inlet window 14 in alignment with a hot water passage 15 formed in lid 5 as shown in FIG. 1. A hot water supply host has not been shown for the sake of clarity. A discharge opening 16 for exhausted coffee meal extends over nearly one quarter of the circumference of the substantially egg-shaped housing, or housing cover, respectively from about half of its height to a location adjacent its lowermost point.

The actuating mechanism of the coffee percolating machine is generally shown in FIGS. 1 and 3. A motor 18 is secured to housing rear wall 1a by means of bolts 19 and drives a semicircular gear segment 20. During rotation over about 180°, segment gear 20 is in engagement with a cam drive gear 21 for actuating lid 5, while engaging a brewing cylinder driving gear 22 for the remaining 180° of its full revolution. Non-rotatably connected to cam drive gear 21 within housing 1 is a cam 23 adapted to force lid 5 into engagement with open end 2b of cylinder 2 in the brewing position as shown in FIGS. 1 and 3. Outside of housing 1, dive gear 21 is non-rotatably connected to an excentric disc 24 cooperating with a switch 25 controlling the brewing process. and secured to the housing outer wall.

Non-rotatably connected to cylinder driving gear 22 is one of the mounting pins 3 of cylinder 2 disposed within housing 1, an cam disc 26 located outside housing 1 and formed with a rise portion 26a cooperating with a microswitch 27 controlling the supply of coffee meal.

Lid 5 is mounted on housing cover 1b by means of substantially U-shaped lid mounting bracket 28. The connection between lid 5 and bracket 28 is formed by an annular adjustment member 29 secured to lid 5 by a snap ring 30. Interposed between adjustment member 29 and bracket 28 is a compression spring 31 effective to raise lid 5 to its rest position. Adjustment member 29 is provided with a bolt 32 having an upwards projecting bifurcate end 32a. A roller 33 is mounted in bifurcate end portion 32a by means of a pin 34 and biased into engagement with cam 23 by the action of compression spring 21.

The operation of the above described coffee percolating machine shall now be explained with reference to four operating positions, three of which are shown in FIGS. 4a, b to 6a, b, respectively, while a fourth position, namely, the brewing position, is shown in FIGS. 1 and 2. The overall brewing cycle is governed by the following concept: The gear segment 20 is continuously rotated by motor 18 and performs a full revolution of 360° for each brewing cycle. Brewing cylinder 2 likewise carries out a full revolution of 360°, although in a discontinuous manner. During the rotation of cylinder 2, piston 6 reciprocates within cylinder by the action of a positive position control means formed by guide path 10 and follower member 9 engaged therewith.

Figure 4:
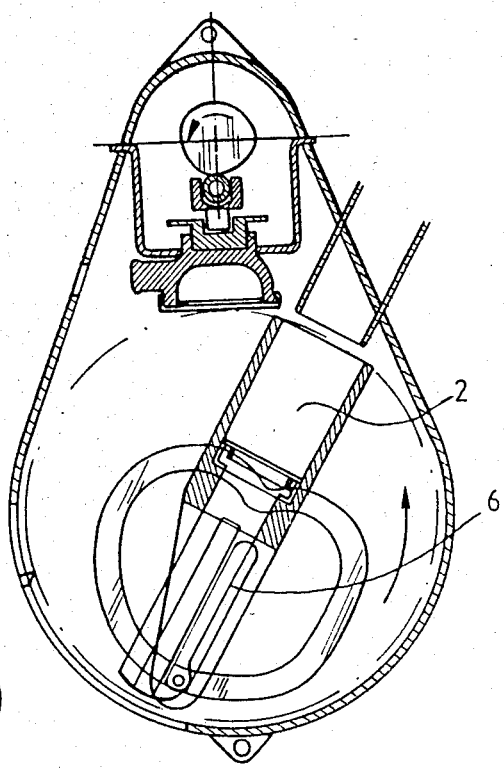
Figure 4:
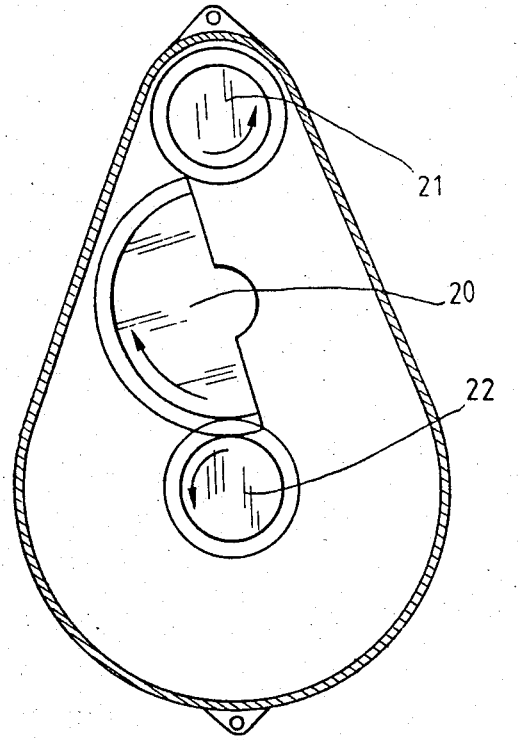
Figure 5:
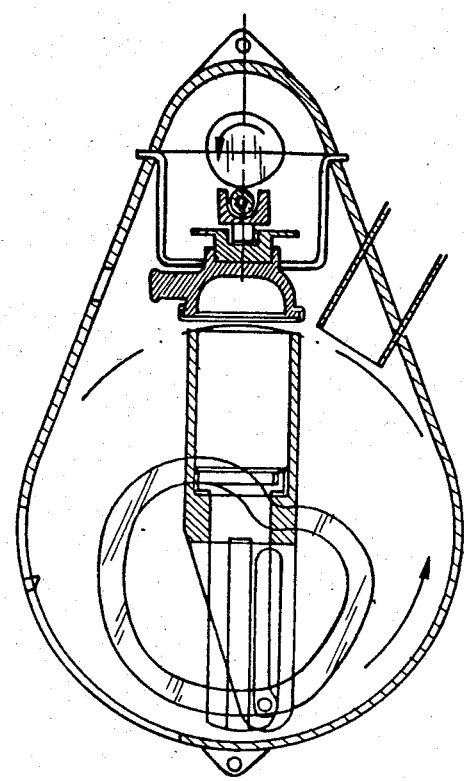
Figure 5:
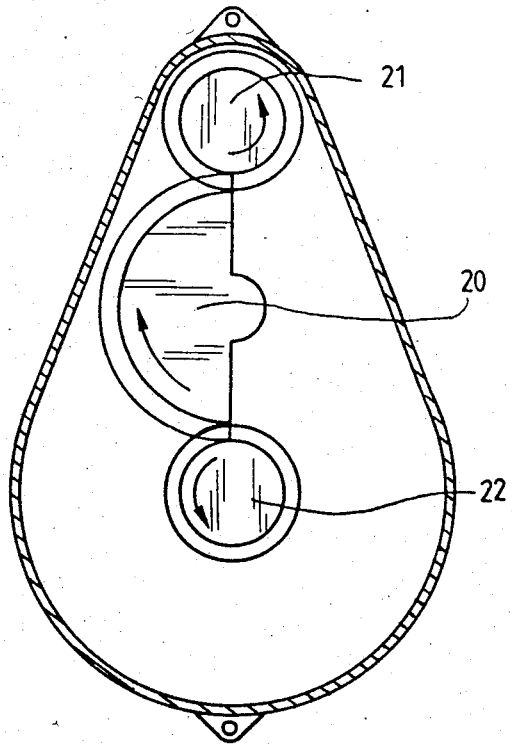
Figure 6:
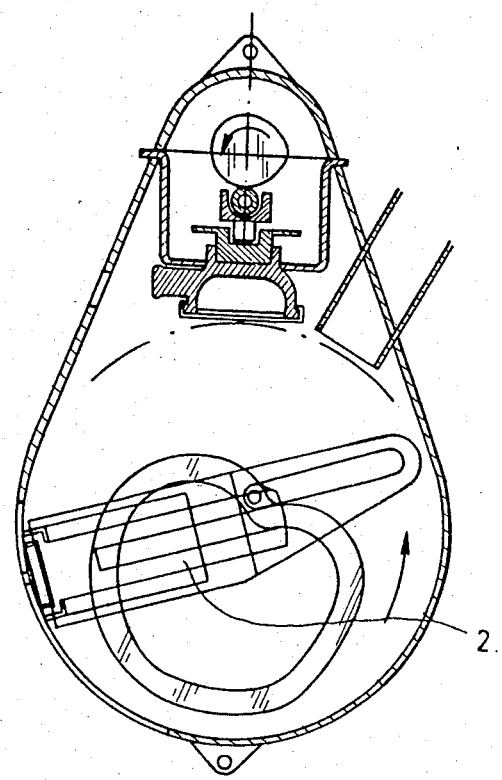
Figure 6:
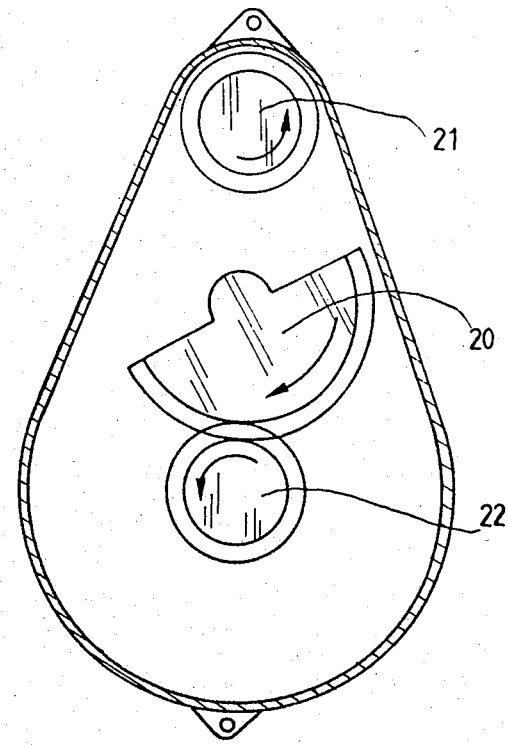

In the rest position between two brewing cycles, gear segment 20, cylinder 2 and piston 6 assume the positions shown in FIG. 4. The brewing cycle is started by initiating the supply of coffee meal through charging means 13 to cylinder 2. Motor 18 is started with a short delay after initiation of the brewing cycle to rotate gear segment 20 in the clockwise direction. In this start-up position, gear segment 20 meshes with cylinder drive gear 22, causing cylinder 2 to be rotated from the position shown in FIG. 4 to the one shown in FIG. 5. In this position cylinder 2 is arrested by engagement of follower member 9 with dwell detent 35 formed in guide path 10. As shown in FIG. 5b, continued rotation of gear segment 20 results in disengagement thereof from cylinder drive gear 22 and meshing engagement with cam drive gear 21. As shown in FIG. 5a, lid 5 is still in its raised position at this point, permitting cylinder 2 to be placed therebelow with its open end. As soon as cam drive gear 21 starts rotating, cam 23 is rotated to its closing position shown in FIG. 1. After lid 5 has thus been closed, excenter disc 24 actuates control switch 25 to initiate the supply of hot water. The hot water enters through inlet window 14 and flows through lid passage 15 and a sieve 36 carried by lid 5. The water thus entering cylinder 2 percolates through the coffee meal supported on piston sieve 8. The resulting coffee brew flows through outlet passage 7 and outlet opening 12 of housing 1 into a receptacle (not shown).

Also during the brewing process proper, segment gear 20 continues to rotate—FIG. 3 shows an intermediate position during this stage—resulting in continued rotation of cam 23. As soon as cam 23 has been rotated by a predetermined angle, compression spring 31 acts to return lid 5 to its raised position. On further rotation, segment gear 20 is released from its meshing engagement with cam drive gear 21 and re-engaged with cylinder drive gear 22. This causes cylinder 2 to be rotated further beyond its locked brewing position. At the same time, piston 6 starts to move towards open end 2b of cylinder 2 by the action of follower member 9 cooperating with the righthand portion of guide path 10 as shown in FIG. 1. In the position shown in FIG. 6a, piston sieve 8 has been moved to a position closely adjacent the open end 2b of cylinder 2, resulting in the exhausted coffee meal being expelled from cylinder 2. Any coffee meal remaining on sieve 8 is removed therefrom by means of a stripper blade 17, for instance a rubber blade or the like. The large discharge opening 16 of housing 1 and the shape of guide path 10 ensure that the discharge of the exhausted coffee meal is carried out over a wide range of the cylinder rotation. As a result, the exhausted coffee meal is completely discharged, so that the supply of cleaning water is not required. The brewing cycle ends at an intermediate position between the discharge position and the charging position. Depending on the arrangement of the drive motor and the control elements associated therewith, the motor may continue to rotate so as to immediately initiate a subsequent brewing cycle, or may be stopped preparatory to be re-started for the next brewing cycle.

The alternating actuation of the cam drive and the cylinder drive permits an advantageously small motor to be employed for carrying out the entire brewing process.

The positive position control means ensures the optimum position of the piston relative to the cylinder during all phases of the brewing cycle. During the charging phase the piston thus assumes its lowermost position, and during the discharge phase, its topmost position. The remaining details such as housing shapes, mounting of the lid and arrangement of control elements may be varied within the scope of the invention.

It is thus within the scope of the invention to devise a coffee percolating machine in which the rotatable brewing cylinder moves within a closed chamber, while all of the drive and control components are located outside thereof.

For improving discharge of the exhausted coffee meal, the outer portion of the brewing cylinder may be provided with guideways for the exhausted coffee meal. These guideways would help to avoid soiling of the apparatus.

I claim:

1. A coffee percolating machine comprising a housing provided with supply means for coffee meal and hot water, an outflow opening for the brewed coffee, and a discharge opening for the brewed coffee, and a discharge opening for exhausted coffee meal, at least one brewing cylinder formed with an open inlet end and mounted in said housing for pivotal motion about an axis perpendicular to its longitudinal axis from a coffee meal charging position to a brewing position and subsequently to a discharge position for discharging the exhausted coffee meal, and a piston disposed in said brewing cylinder for axial displacement therein, the improvement comprising:

positive position control means for controlling the position of said piston, including mechanical linkage means operatively coupled to the piston.

2. A coffee percolating machine according to claim 1, characterized in that said positive position control means comprises a guide path (10) provided in said housing (1) and a follower member (9) associated with said piston (2).

3. A coffee percolating machine according to claim 2, characterized in that said guide path (10) is formed as a closed curve.

4. A coffee percolating machine according to claim 2 or 3, characterized in that said guide path (10) is formed as a groove in the housing wall (1a).

5. A coffee percolating machine according to claim 2, characterized in that said follower member comprises a revolution body (9a) resiliently supported on said piston (6).

6. A coffee percolating machine according to any of claims 1 to 3, characterized in that said follower member (9) is disposed at the end of said piston (6) facing away from said brewing cylinder (2), an extended wall portion (2a) of said brewing cylinder (2) being formed with an elongate opening extending parallel to said piston (6) and having said follower member (9) extending therethrough.

7. A coffee percolating machine according to any of claims 1 or 2, characterized in that said pivotal motion of said brewing cylinder (2) is brought about by means of a driven gear segment (20) adapted to engage a brewing cylinder drive source (22) for about one-half revolution.

8. A coffee percolating machine according to claim 7, comprising a lid member adapted during the brewing step to be forced into engagement with the edge of the brewing cylinder by means of a driven cam, characterized in that a cam drive means (21) is engaged with said gear segment (20) substantially during the other half-revolution thereof.

9. A coffee percolating machine according to claim 7, characterized in that said gear segment (20) is continuously driven to rotate during the brewing cycle.

10. A coffee percolating machine according to any of claims 1 or 2, characterized in that a dwell detent means (35) is provided in association with said guide path (10) at a location corresponding to the brewing position of said brewing cylinder (2) for cooperation with an engagement member (9) provided on said piston (6).

11. A coffee percolating machine according to claim 10, characterized in that said dwell detent means (35) is disposed in said guide path (10), said follower member (9) being formed as said engagement member.

12. A coffee percolating machine comprising:

a housing provided with supply means for coffee meal and hot water, an outflow opening for the brewed coffee, and a discharge opening for exhausted coffee meal;

at least one brewing cylinder formed with an open inlet end and mounted in said housing for pivotal motion about an axis perpendicular to its longitudinal axis from a coffee meal charging position to a brewing position and subsequently to a discharge position for discharging the exhausted coffee meal;

a piston disposed in said brewing cylinder for axial displacement therein; and positive position control means for said piston responsive to the pivotal motion of said brewing cylinder, said positive position control means comprising a guide path provided in said housing and a follower member associated with said piston.

13. A coffee percolating machine according to claim 12, including a follower member disposed at the end of said piston facing away from said brewing cylinder, an extended wall portion of said brewing cylinder being formed with an elongate opening extending parallel to said piston and having said follower member extending therethrough.

14. A coffee percolating machine according to claim 12, wherein the pivotal motion of said brewing cylinder is brought about by means of a driven gear segment adapted to engage a brewing cylinder drive source for about one-half revolution.

15. A coffee percolating machine according to claim 14 said gear segment being continuously driven to rotate during the brewing cycle.

16. A coffee percolating machine comprising:

a housing;

a brewing cylinder mounted for pivotal movement within the housing;

a piston disposed in said cylinder for axial displacement therein; and control means including mechanical linkage for positively positioning said piston in said cylinder.

17. A coffee percolating machine according to claim 16, wherein said control means includes cam means for axially displacing said piston when said cylinder is pivoted.

18. A coffee percolating machine according to claim 16, said control means comprising a guide path in said housing and a follower member coupled to said piston and operably received in said guide path.

* * * * *

UNITED STATES PATENT AND TRADEMARK OFFICE
CERTIFICATE OF CORRECTION

PATENT NO. : 4,579,049
DATED : April 1, 1986
INVENTOR(S) : Patrick Rodrigues

It is certified that error appears in the above-identified patent and that said Letters Patent is hereby corrected as shown below:

In Column 6, line 65, after "coffee,", please delete
--and a discharge opening for the brewed coffee,--

Signed and Sealed this

Twenty-ninth Day of July 1986

[SEAL]

Attest:

DONALD J. QUIGG

Attesting Officer

Commissioner of Patents and Trademarks